United States Patent [19]

Muskatello et al.

[11] Patent Number: 5,187,641
[45] Date of Patent: Feb. 16, 1993

[54] PATIENT MONITORING UNIT AND CARE STATION

[75] Inventors: James M. Muskatello; Darryl Parmet, both of Tampa; George C. Lysy, Palm Harbor; Maynard R. Ramsey, III, Tampa, all of Fla.

[73] Assignee: Critikon, Inc., Tampa, Fla.

[21] Appl. No.: 782,020

[22] Filed: Oct. 24, 1991

[51] Int. Cl.⁵ ............................................. H05K 7/16
[52] U.S. Cl. ....................... 361/380; 361/390; 52/28; 312/223.2; 248/918
[58] Field of Search .......... 248/917, 918, 919, 920, 248/921, 922, 923; 400/682; 312/208, 280, 7.2, 223, 223.2; 361/380, 390, 391, 392, 393, 394, 395, 399; 52/27, 28, 29, 36

[56] References Cited

U.S. PATENT DOCUMENTS

| 3,844,395 | 10/1974 | Mero et al. | 400/682 X |
|---|---|---|---|
| 4,478,382 | 10/1984 | Carrier | 248/923 X |
| 4,496,200 | 1/1985 | Hagstrom et al. | 312/208 |
| 4,516,751 | 5/1985 | Westbrook | 248/920 X |
| 4,560,132 | 12/1985 | Wilder | 248/919 X |
| 4,576,578 | 3/1986 | Parker et al. | 400/682 X |
| 4,624,510 | 11/1986 | Jedziniak | 248/917 X |
| 4,638,969 | 1/1987 | Brown | 248/919 X |
| 4,696,522 | 9/1987 | Lowe | 312/208 X |
| 4,708,312 | 11/1987 | Rohr | 248/921 X |
| 4,709,972 | 12/1987 | LaBudde et al. | 312/208 |
| 4,735,467 | 4/1988 | Wolters | 312/29 |
| 4,861,121 | 8/1989 | Gotz | 312/208 |
| 4,964,606 | 10/1990 | Beam et al. | 248/919 X |
| 5,007,608 | 4/1991 | Carroll, Jr. | 248/917 X |
| 5,020,449 | 6/1991 | Forte | 248/917 X |
| 5,041,770 | 8/1991 | Seiler et al. | 248/918 X |
| 5,071,204 | 12/1991 | Price et al. | 312/208 X |

FOREIGN PATENT DOCUMENTS

| 280096 | 8/1988 | European Pat. Off. | 248/919 |
|---|---|---|---|
| 60-84623 | 5/1985 | Japan | 312/208 |
| 2069197 | 8/1981 | United Kingdom | 341/22 |
| 85-01648 | 4/1985 | World Int. Prop. O. | 248/922 |

Primary Examiner—Leo P. Picard
Assistant Examiner—Michael W. Phillips
Attorney, Agent, or Firm—Paul A. Coletti

[57] ABSTRACT

A care management workstation unit which contains three basic elements. There is a cathode ray tube or CRT, a mount, and a system unit. The CRT is rotatably mounted on the mount. It is capable of any rotational position and is able to be balanced at all such positions. The CRT is unique in that it is integral to the system. The mount connects the CRT to the system unit. It is able to be mounted flush against a wall such that the entire unit is supported by the mount. The system unit is also flush with the wall and the wall mount so that the entire system may be placed for mounting against a wall. In all, these three devices combine into one system to provide for a powerful, compact and ergonomically successful device which enables one to use the system virtually anywhere within a hospital or industrial setting.

44 Claims, 7 Drawing Sheets

PATIENT MONITORING UNIT AND CARE STATION

FIELD OF THE INVENTION

Generally, this invention relates to patient care, data management and monitoring systems. More specifically, this invention relates to a unique arrangement for a patient care, data management and monitoring system. Most specifically, this invention relates to a unique arrangement for a patient care data management and monitoring system, whereby the patient care data management and monitoring system is both effective and conveniently located at all times during its use, with respect to both its user and its beneficiary, the patient.

BACKGROUND OF THE INVENTION

Increasingly, hospitals are using bedside data management systems in order to perform typical hospital and nursing care functions. These systems bring together two important technologies—data management services as well as vital signs measurement and monitoring—together in one transportable unit. These systems help save time in diagnosis and care of patients. They enhance patient care. As well, they are effective in containing hospital costs, and in enhancing nursing effectiveness.

Typically, bedside data management systems provide data communications to a care management workstation either remotely or via a standard telephone wire. At the care management workstation unit is a microcomputer which stores patient data and controls information flow between the bedside and a central repository for data. Reports and other printed documents may be generated on a printer associated with the care management workstation unit. These care management workstation units are able to interface with other hospital information systems, such as admission records, patient transfers, laboratory reports, etc. These can all be electronically transferred to the care management workstation unit as needed, either to update or pay the patient's record or to investigate and solve particular patient care problems.

Typically, these care management workstation units have both input capabilities through, for instance, a teletype keyboard or light pen, as well as output via a CRT (cathode ray tube) and printer. Yet, these bedside data management systems have had some significant drawbacks. For instance, the CRT's connected to the nursing systems unit typically are mounted so that they are either impossible or difficult to rotate to meet the needs of the nurse using the system. In fact, some CRT's are not attached to the system and must be retrofitted. The CRT's may be difficult to use without moving the entire system, and cannot be adapted for use in either a standing or sitting position. If the CRT is mounted, it is generally done so inconveniently, that is by means of a limited motion ball joint which operates around the center of mass of the CRT, so that positioning of the CRT through more than 20°-30° is not possible. For this reason, the user is not simultaneously able to position the CRT for standing or sitting use.

As previously recognized, in many instances there is no mount associated with the CRT and the computer. As a result, the CRT either sits on the computer or apart from the unit. If there are mounts, these typically provide center of mass mounting so that there is no rotational capability for the system without the aforementioned balancing problem. In some instances, mounting is made apart from the unit, either on a wall or on a desk, so that it is difficult to use the unit associated with the computer. And, in cases where the CRT is mounted above the computer, there is usually not enough clearance between the CRT and the computer, so that there is no easy accessibility to the computer cover, or for use as a support or as a table, if desired.

Finally, concerning the system unit, the computer itself, typically these system units are not able to be mounted on either the wall or the table. The system units may be provided with either wall mounting or table mounting, but not both. They are typically quite large systems and so take up excessive space. These systems have an associated keyboard, yet the keyboard is not integral with the unit but rather is left freestanding, so that additional space for the keyboard is required. Furthermore, typical personal computers have no capability of having vital signs monitors built into them.

Many of these system units, furthermore, do not contain apparatuses for mounting a CRT. If there are mounting means, they do not provide strain relief for the mounting means, such that CRT mounting is quite flimsy.

Also, these systems do not contain internally isolated power supplies. Typically, they will have a transformer as a separate unit, such that if isolation of the power supply is required, one must make room for both the system unit with its power supply and an associated isolation transformer.

Another perceived drawback of previous systems is that they are ineffective to use with a cart for availability at the patient's bedside. This is because the system unit takes up the entire tabletop of the cart, and there is no place for the nurse to place any additional items which might be necessary for patient care, and well as convenience items such as pens, pads, coffee cups and the like.

SUMMARY OF THE INVENTION

Therefore, it is the object of the invention to design a patient care and monitoring station which economizes size and ergonomics and yet enhances patient and use function and safety.

It is further an object of the invention to design a powerful yet flexible and expandable system which may be upgraded to keep pace and current with hospital service changes.

Finally, it is an object of the invention to allow measurement or monitoring options within the care management workstation unit itself, to greatly expand the performance capabilities of such care management workstation unit.

These and other objects of the invention are embodied in a unique a care management workstation unit which contains three basic elements. There is a cathode ray tube or CRT, a mount, and a system unit. The CRT is rotatably mounted on the mount. It is capable of any rotational position and is able to be balanced at all such positions. The CRT is unique in that it is integral to the system.

The mount connects the CRT to the system unit. It is able to be mounted flush against a wall such that the entire unit is supported by the mount. The mount also enables the CRT to have rotational capabilities. The mount is integrally located within the system unit.

The system unit is compact. It contains an integral keyboard which allows much greater counter space if table mounted, and reduces keyboard projection if wall mounted. There is space placed between the CRT and the system unit for use of a mouse as a computer control device, if desired. The system unit is also flush with the wall and the wall mount so that the entire system may be placed for mounting against a wall and have a depth projection of no more than 12-13 inches away from the wall. Alternately, the system unit contains mechanisms which allow it to be mounted on a desk or tabletop. The system unit further contains an integrally located isolation transformer so that this unit does not take up valuable space apart from the system.

In all, these three devices combine into one system to provide for a powerful, compact and ergonomically successful device which enables one to use the system virtually anywhere within a hospital or industrial setting, and, in virtually any position, including sitting or standing. As described, therefore, the objects of the invention will be better realized from the attached Detail Description of the Drawings taken in combination with the Detailed Description of the Invention.

DETAILED DESCRIPTION OF THE DRAWINGS

Figure 6:
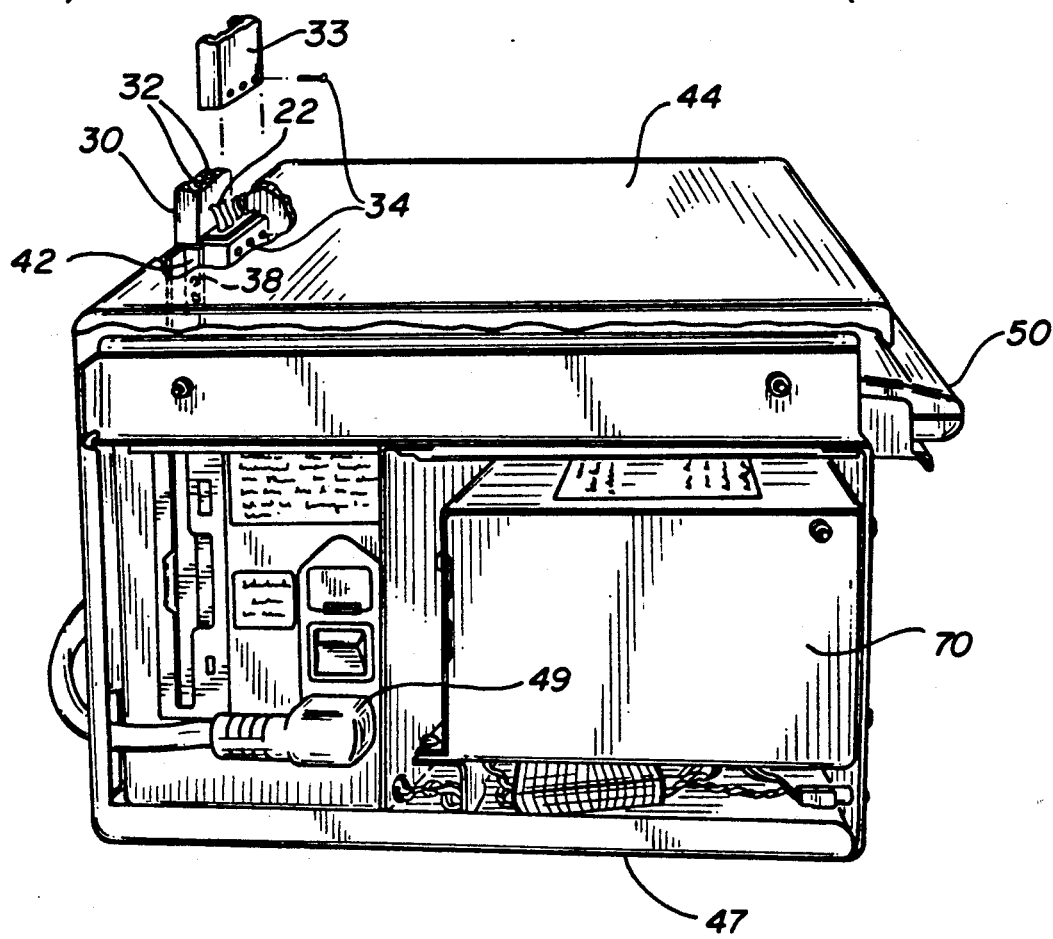
Figure 7:
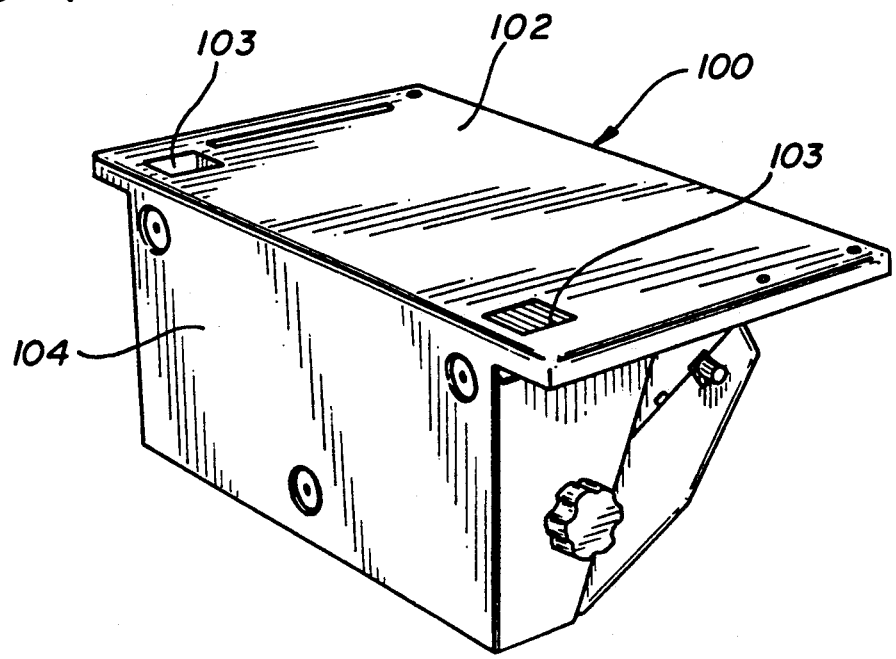
Figure 6A:
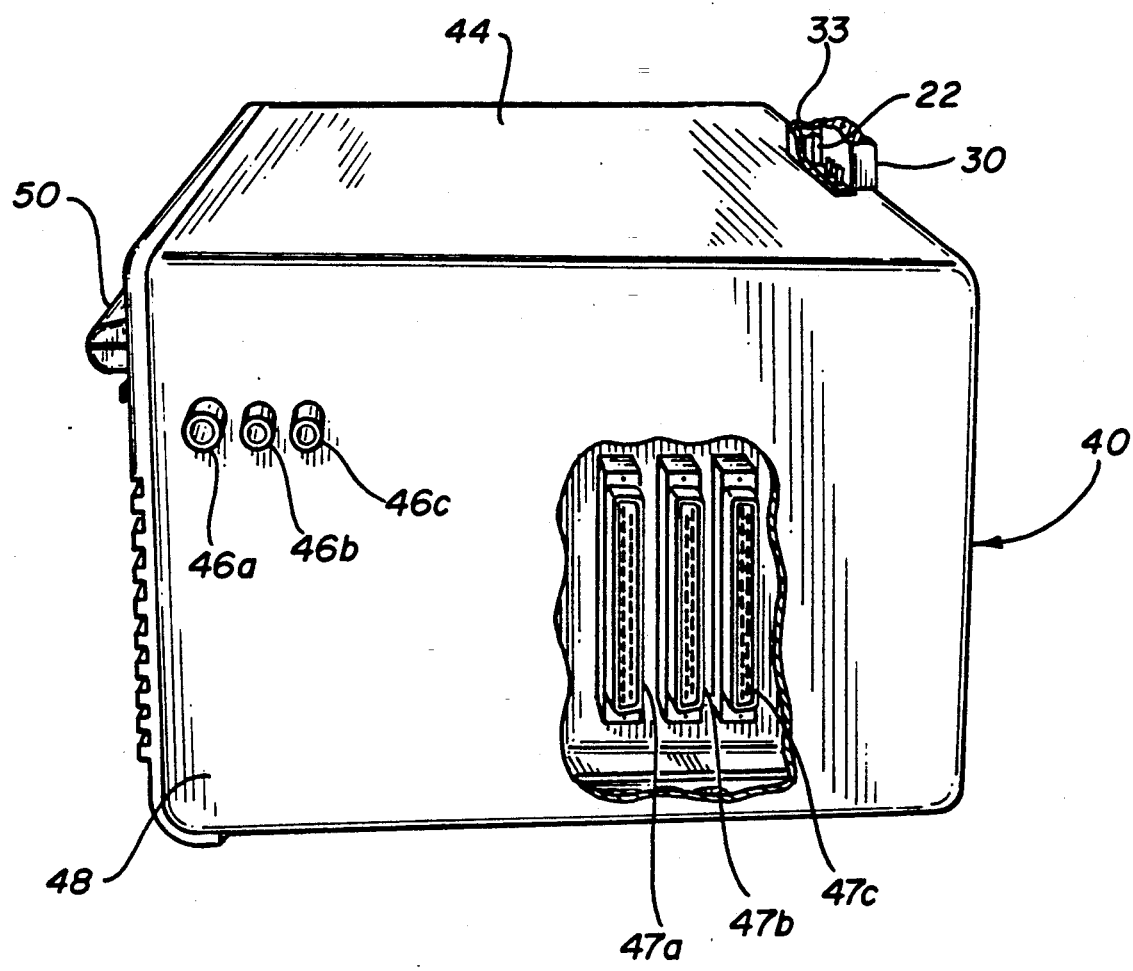

FIG. 6 is a side view of some of the internal mounting jacks of the system unit and on a portion of which the cover is removed to show the positioning of the mounting bracket with respect to the system unit; and FIG. 6a is a side view of the opposite side of the system unit; an FIG. 7 is a perspective view of the lower wall mounting bracket of the system unit, which may be attached to the system unit, in either wall or table mounting capabilities.

DETAILED DESCRIPTION OF THE INVENTION

Figure 1:
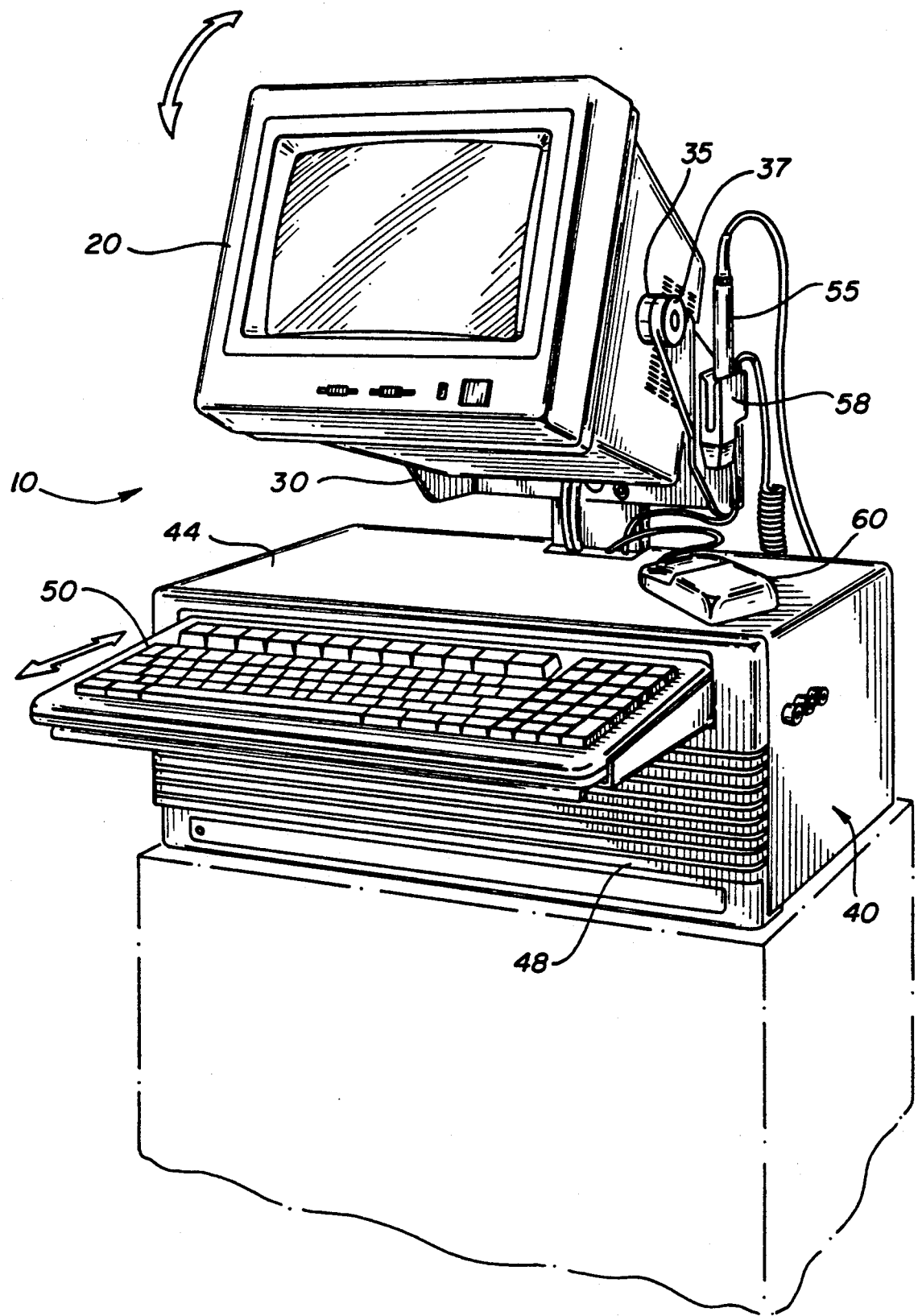
FIG. 1 is a perspective view of a patient monitoring unit and care station as described by this invention.

As seen from FIGS. 1-7, and especially a FIG. 1 the care management workstation unit 10 is comprised of three basic elements. This workstation 10 is ideally adapted for use at a nurses' station, in the hospital halls, or at a patient's bedside. There is a cathode ray tube or CRT 20, coupled to a mounting bracket 30 and a system unit 40, which may include a personal computer. As can be seen from FIGS. 2a, 3a and 5, which contrast older systems much less compact systems and which created much clutter and many of the dysfunctional capabilities specifically avoided by this system. This system provides for a functional, compact and useful system enhancement and therefore allows for increased advancement for the bedside data management system art. Now, each of the elements of the present system 10 will be examined in order.

The CRT 20 is either a monochrome or color CRT ranging in size from 9 inches to 14 inches. Importantly, the CRT 20 is smaller in depth than typical CRT's used in care management workstation units, measuring only inches in depth. Furthermore, CRT 20 is configured to be rotatable through many degrees, approximately 90 or more degrees. In this way, the user is capable of placing the CRT 20 at eye level, regardless of whether eye level is for standing or sitting purposes or for varying height of the user. Also the CRT 20 is integrated into the system. That is, CRT 20 is attached in some way to the system 10, and is not a separate unit, which is a problem encountered in using other bedside data management systems.

Figure 2:
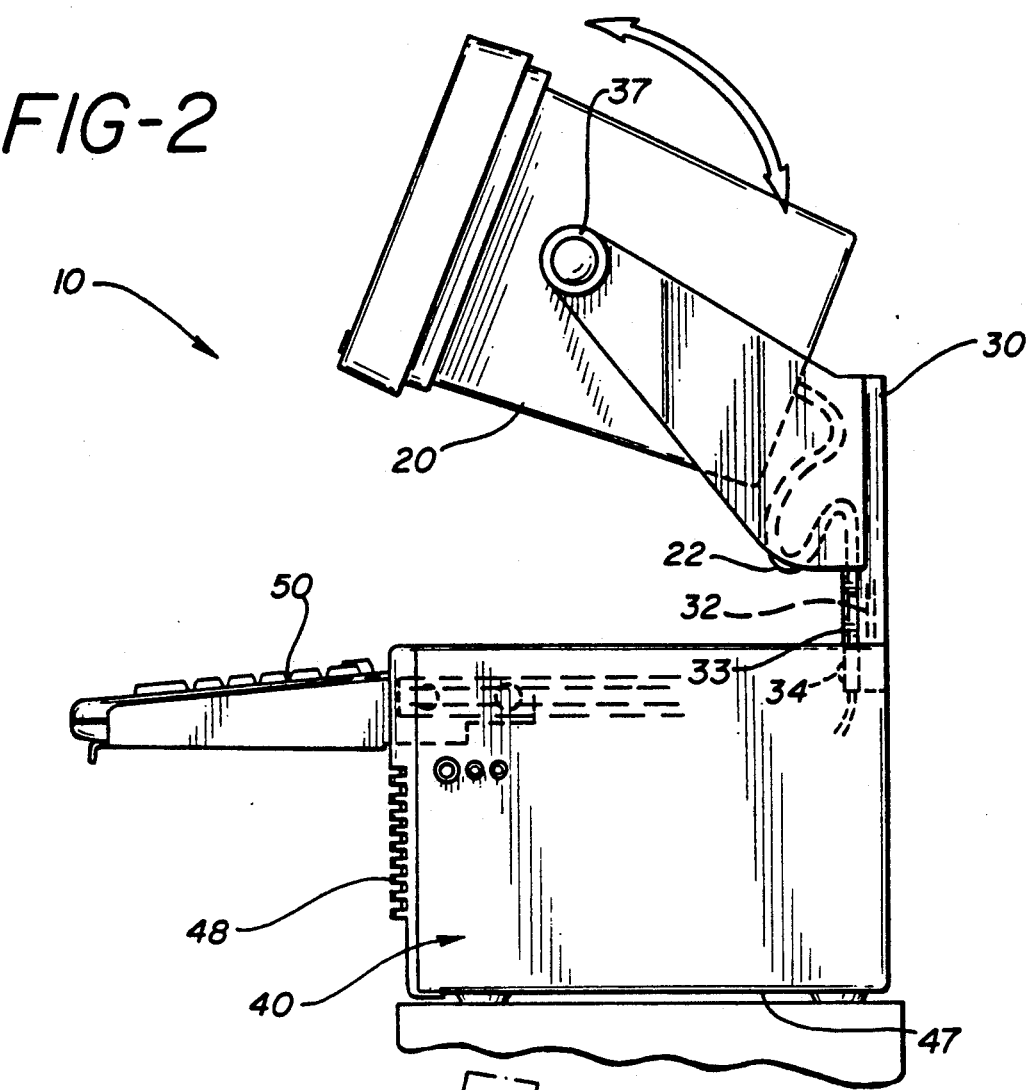
FIG. 2 is a side view of the invention showing the integrated keyboard and the rotational capabilities of the CRT.
Figure 2A:
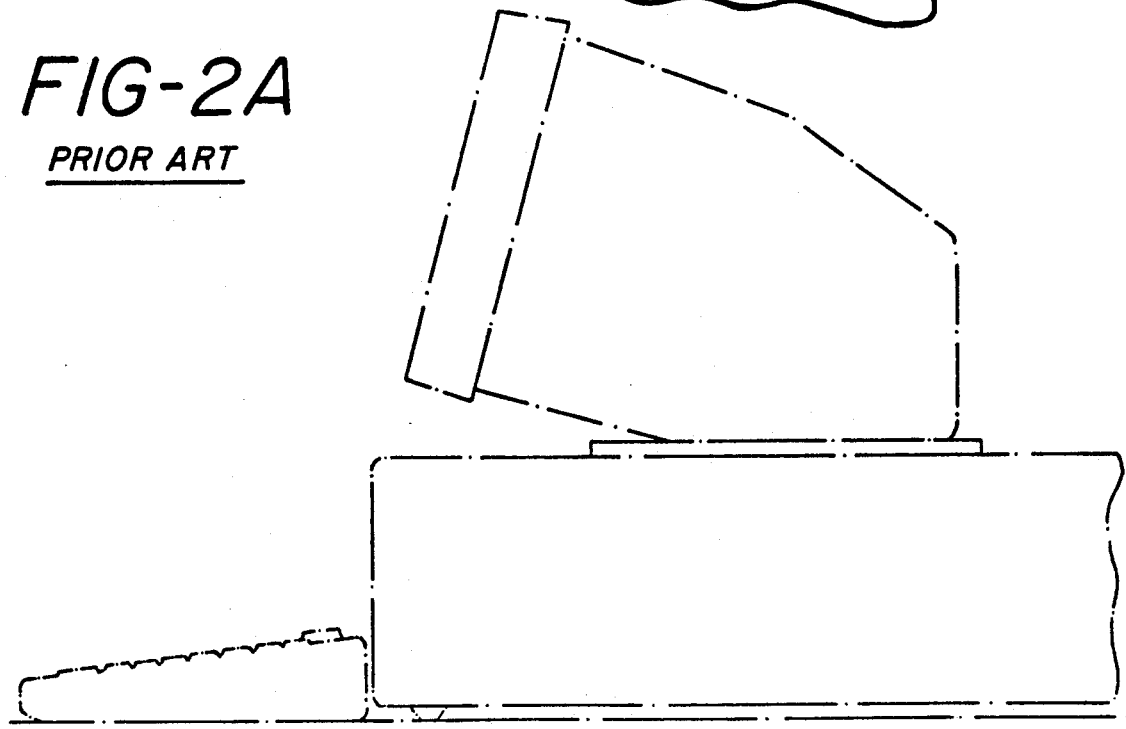
FIGS. 2a and 3a are comparisons of prior art systems.
Figure 3:
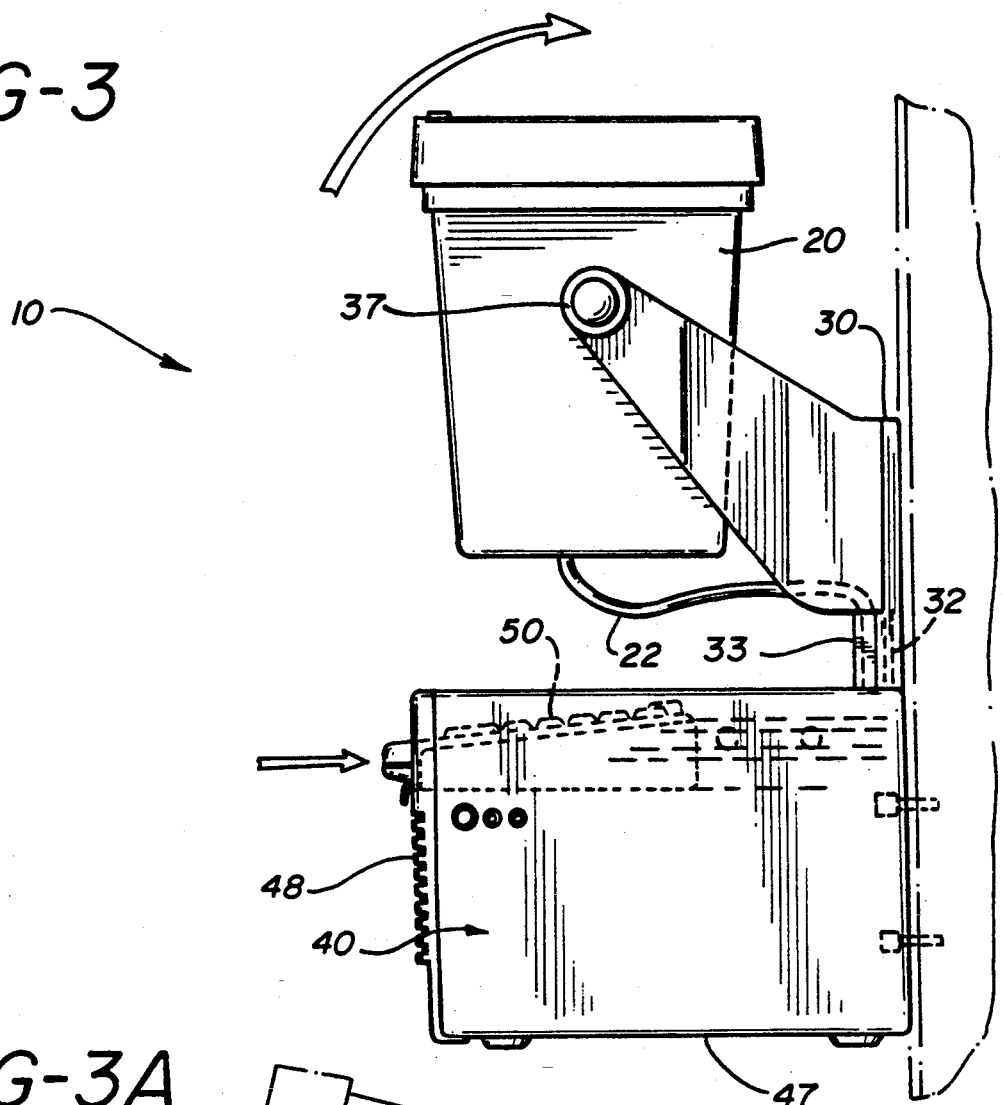
FIG. 3 is a side view of this invention showing the CRT in a full vertically rotated position, the integral teletype keyboard located within the system unit, and the entire system mounted flush against a wall.
Figure 3A:
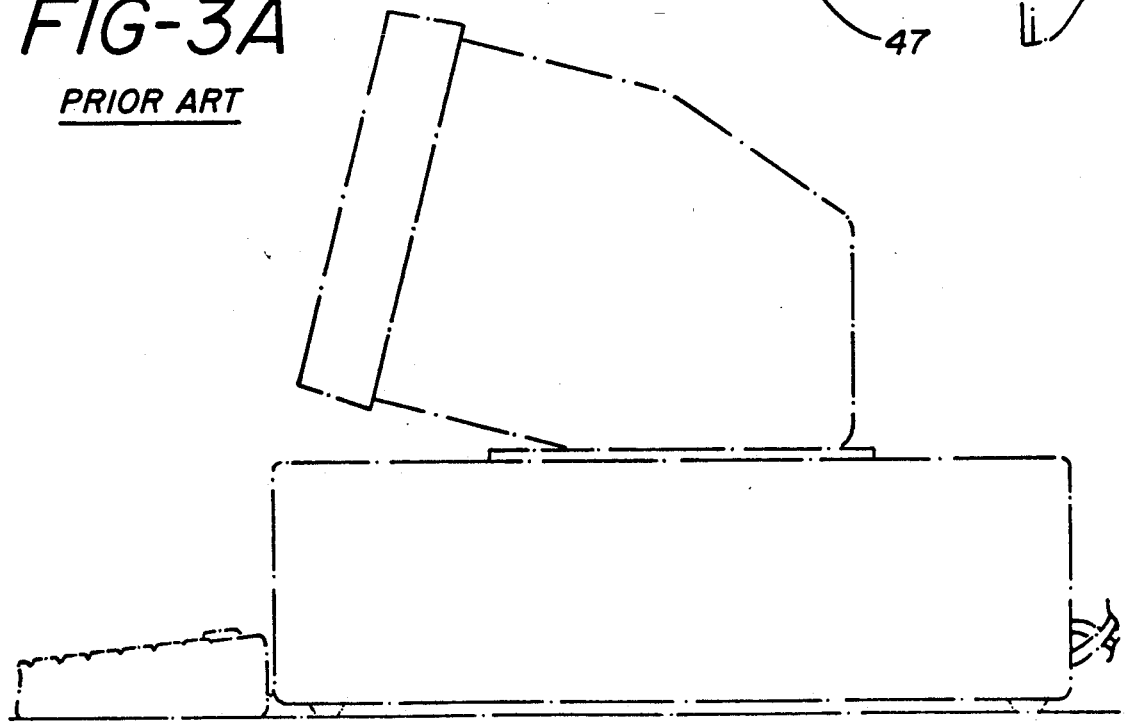

As can be seen from FIGS. 1, 2 and 3, the CRT 20 is spring mounted on a mounting bracket 30. This spring mounting is provided by a torsion spring 35 placed within swivel 37 and is formed into a slip-clutch type mount. Torsion spring 35 provides resistance against the weight of CRT 20 where it is connected to the swivel 37. In this way, spring 35 is able to withstand shifts in position of the center of gravity of CRT 20. This enables bracket 30 to hold the weight of the CRT unit 20 in virtually any position. Thus, whether CRT unit 20 weighs five pounds (for typical black and white CRT's) or 12 pounds (for typical color units), bracket 30 and torsion spring 35 adequately hold CRT 20 in place. In this way, the CRT 20 now becomes much more ergonomically functional within the system 10.

The mounting bracket 30 is another important feature of this system. This mounting bracket 30, as can be seen in FIGS. 2 and 3, is capable of being placed flush against a wall. Simultaneously, this mounting bracket 30 is capable of maintaining CRT 20 without rotating CRT 20. As can be seen from FIGS. 4 and 6, in one preferred embodiment, the mounting bracket 30 may contain, under cover 33, a plurality of internal chambers or cable accepting channels 32 which are capable of guiding the wires 22 from the CRT unit 20 into the system unit 40. Cover 33 is retained by screws 34. Alternately, wires 22 may be inserted in a split-block, not shown, which similarly provides a water tight seal in system unit 40. Further, the mounting bracket 30 has internally placed screws 38 which hold the mounting bracket 30 against the system unit 40, so that system unit 40 and CRT 20 form an integral unit.

Mounting bracket 30 is placed within the system unit 40 in a bayonet type mount 42 which makes the mounting bracket 30 much more secure. Furthermore, the rigidity in mounting the mounting bracket 30 causes additional security in the mounting of the CRT. Additionally, one of the useful functions of this mounting bracket 30 is that its rigidity and integrality to the system 10 through its bayonet mount 42, which makes the mounting bracket 30 and the CRT unit 20 integrally replaceable. Yet, because the CRT unit 20 and mounting bracket 30 are attached to the system unit 40 via the screws 38 placed under system unit cover 48, this prevents theft of either unit separately. Advantageously this arrangement also prevents accidents, because CRT 20 cannot be pushed off the top of system unit 40, due to the rigid attachment between these units.

Because the mounting bracket 30 is configured to have a slightly upward angle of mounting away from the system unit 40, this allows rotation of the CRT 20 in a front projection so that compactness is maximized. That is, the CRT 20 does not rotate so that its front face is placed in a horizontal plane set apart from the wall on which is mounted the system unit 40 on bracket 30. This front projection is roughly 11.5", and no more than 13 inches which is easily smaller than current units, and allows the system to be placed in a corridor or within a care management workstation, without the worry of clumsiness or inhibition of ability to work.

As seen in FIG. 1, there is provided a position 58 on the mounting bracket 30 for placing of a light pen 55. Also, it is conceivable that such units as a mouse 60, as further seen in FIG. 1, or other computer affiliated peripherals like a track ball may be mounted on the mounting bracket without compromising the performance of this system. Similarly, a touch screen can be fitted to CRT 20 without change of the system.

As seen in FIGS. 1, 2, 3, 4, 6 and 7, the system unit 40 of this invention is quite compact and yet highly functional. Contained within system unit 40 is a typical large memory computer which has all the usual computer capabilities and interfaces, and yet is also a computer which is able to be maintained in a very limited space environment. The depth of the computer is compact, only 11.5", and this allows it to be placed in virtually any situation for mounting. The mount 30 is capable of being placed flush against the wall. As well, system 40 may be mounted flush on a table, a function that is quite unique to the bedside data management industry. If the table itself has a computer compatible cutout, cables may be mounted through the bottom of the unit 40 and into the table.

Furthermore, there is found in this system unit an integral keyboard 50. This integral keyboard 50 is formed as a rack item on system 40. So, while the keyboard 50 can be scrolled in or out, depending on need of use, the tabletop 44 of the system 40 remains clear, and is able to accommodate any number of computer compatible devices. For instance, as shown in FIG. there is mounted a computer mouse 60. Because the cover 48 of system 40 is watertight, the user can use top 44 of the system unit as an actual table and place pads, clipboards, and pens and the like, as well as casually place a cup of coffee or soda on top 44 without worry of spilling into the system unit 40, and allowing both hands of the user to be free for system use and/or patient use.

Figure 4:
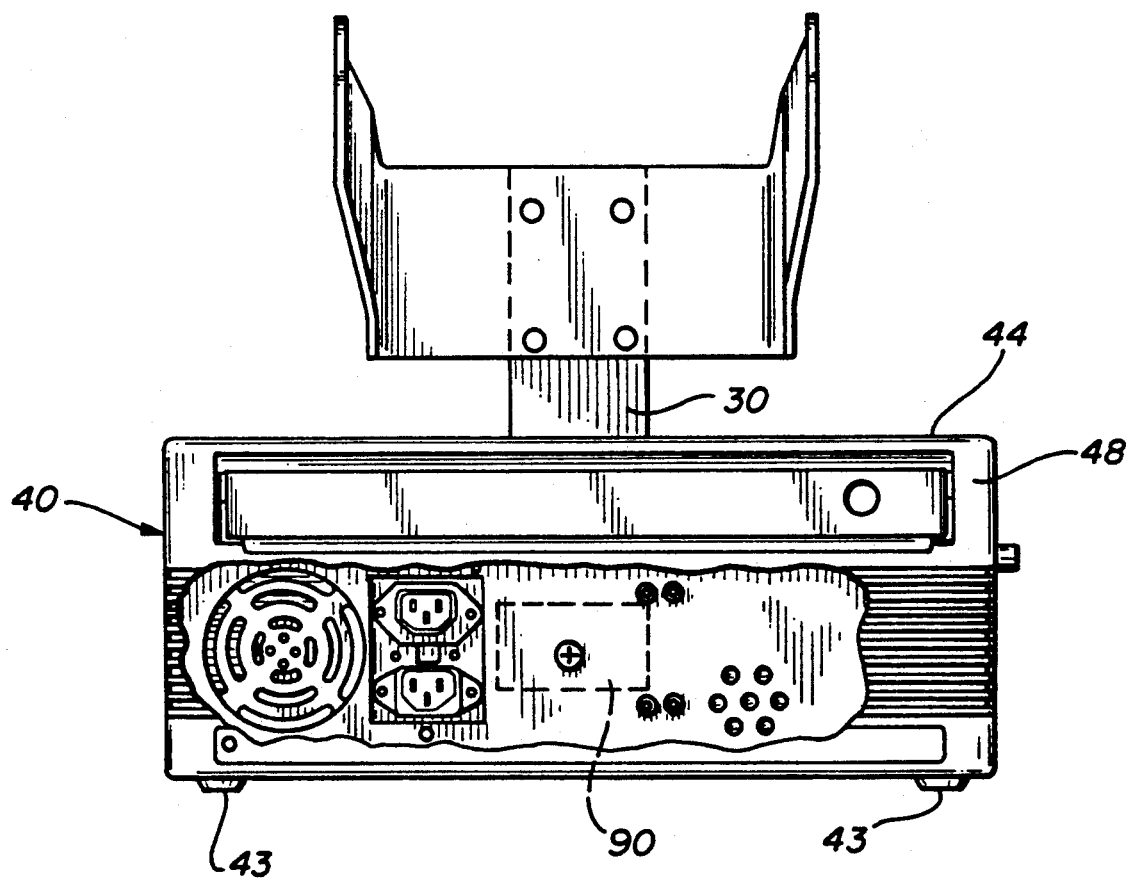
FIG. 4 is a front view of the system unit and the CRT mounting bracket.
Figure 5:
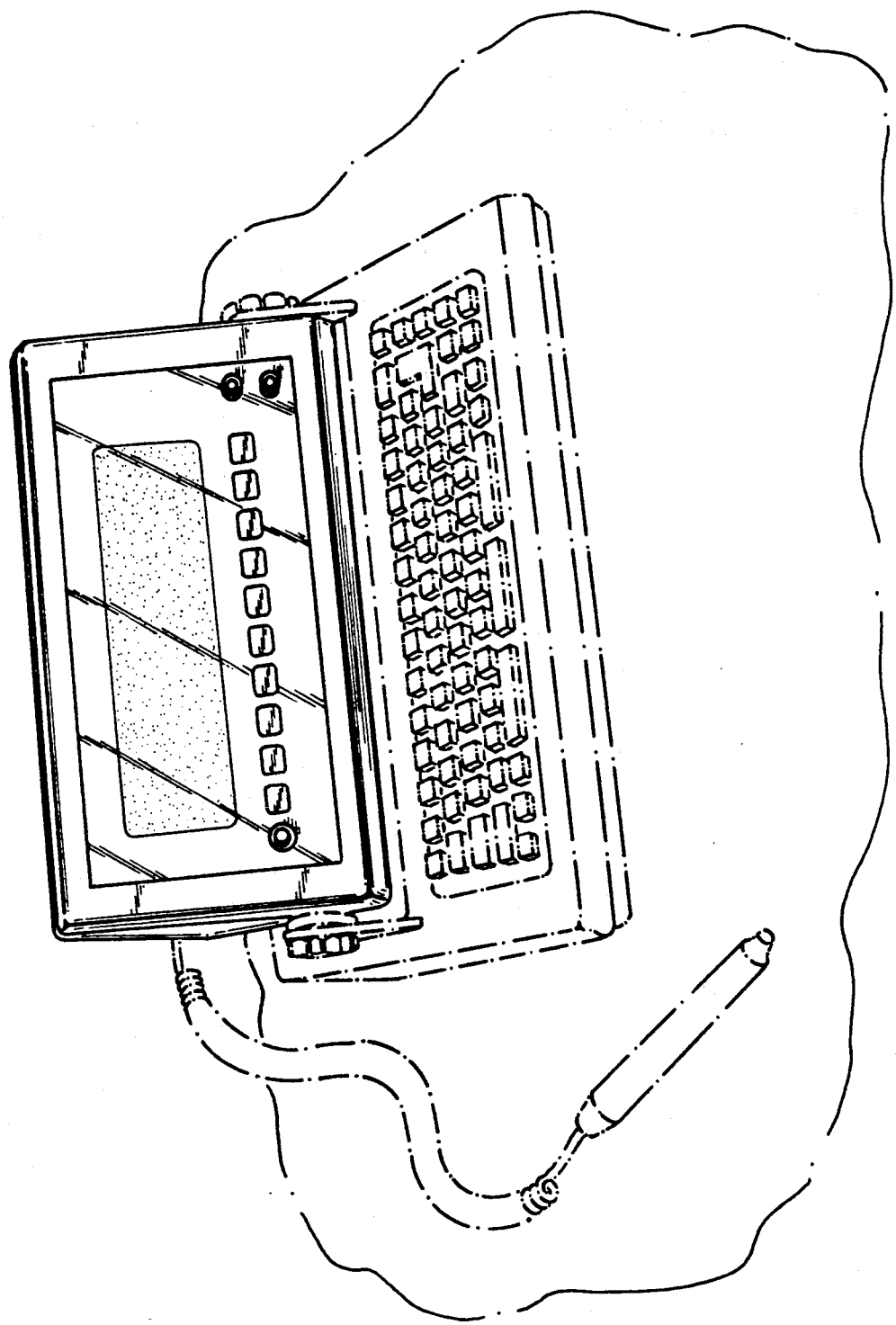
FIG. 5 is a view of prior art system.

Furthermore, as can be noticed from FIG. 4, the system unit 40 is mounted with space between it and CRT 20, and with the CRT 20 centrally located. The tabletop 44 of the system unit 40 becomes quite functional to either the left-handed or right-handed user. Also, the spacing between the mounting bracket 30 and system unit 40 allows for work space upon the entire system unit tabletop. As seen in FIG. 6, the integral internal ports 49 for cables and for mount 30 of CRT 20 allow for the sealing, and the prevention of leakage within the cabinet of the system unit 40. Also, this decreases the bulkiness of the entire unit 40. As well, it also provides for an entirely integral system. The mounting bracket 30, because it is internally mounted within the system unit 40, provides strain relief and torque resistance to the system 10, and is therefore capable of meeting all user and industrial functions.

As is seen in FIG. 4 in combination with FIG. 6, there is also provided an internally mounted power supply 70 and isolation transformer 90. This internally mounted transformer 90, which is a modification of a commercially available design, allows for the use of an industry standard power supply system unit. In this way, the entire system unit 40 is mobile and fully integral, and is able to be compactly transported without need to worry about the need for a separate isolation transformer.

As further seen in FIG. 6a, the right side of system unit 40 is provided with connector parts 46a, 46b, 46c on cover 48, which allow connection to a patient of the internally installed monitoring electronics or other monitoring units such as additional systems emplaced in the lower mounting bracket 100 of FIG. 7. Also, importantly, it is seen that these connector parts 46a, b, c are integral to system unit 40, which creates a powerful computing source. In both these ways, system unit 40 is substantially different from a typical computer, which has no such monitoring capacity.

Also, as seen in FIG. 6a, there are provided internal computer peripheral connectors, 47a, 47b, 47c. These connectors are located within the unit 40, and eliminate the danger of tampering with the computer. As well, they improve the system aesthetics.

As can be seen from FIG. 7, as well as FIGS. 2 and 3, there is provided a lower mounting bracket 100 which is compatible with the planar lower surface which forms the underside 47 of the system unit 40. In this way, system unit 40 can be fit into the holes 103 provided in the top 102 of the lower mounting bracket 100, which also fits flush on side 104 against a wall. Then, a modular vital sign monitoring unit can be placed within this lower mounting bracket 100 so that this system 10 can be enhanced to provide other vital signs monitoring functions in addition to, or in place of the monitoring electronics optionally included in the system. Yet with the lower mounting bracket 100 so configured, tabletop 44 still remains available on system unit 40, and modularity is maintained. Of course, because the feet 43 (FIG. 4) of the system unit 40 fit within the lower mounting bracket 100, there is no need to remove any of the mounts during placement of this lower mounting bracket 100.

As can be further seen from FIGS. 1 and 4, because the cover of the system unit 40 may be removed without taking off any of the mounts, this system is quite easy to service. It is able to be reached without much difficulty and therefore provides for easy remedial care to this care management workstation 10.

In use, therefore, an integral, modular and compact care management workstation unit 10 is provided, which has many ergonomic enhancements previously unavailable. Furthermore, the system is powerful enough to handle all bedside data management functions without compromising this utility, including optional electronic patient monitoring, as well as the more traditional computing functions.

The objects of the invention are to be understood from the attached claims and their equivalents.

What is claimed is:

1. A bedside data management system comprising:
a system unit;
a display means;
a mounting bracket, said mounting bracket supporting said display means and said mounting bracket integrally connected to said system unit, and wherein;
said system unit and said mounting bracket each have a planar back surface, such that said mounting bracket and said system unit may be mounted against a wall with said respective back surfaces coplanar and abutting the wall, with said display means supported by said mounting bracket.

2. The system of claim 1 wherein said mounting bracket supports said display means by means of a torsion spring.

3. The system of claim 2 wherein said display means is a cathode ray tube rotatable about said mounting bracket, and wherein said torsion spring maintains the rotational position of said cathode ray tube independent of user placement of said cathode ray tube.

4. The system of claim 3 wherein said cathode ray tube is less than 13 inches in depth.

5. The system of claim 3 wherein said mounting bracket has a pair of arms for supporting said cathode ray tube.

6. The system of claim 3 wherein said mounting bracket is attached to said system unit by a plurality of screws, and said system unit contains a cover with an opening accepting said mounting bracket such that a cover section of said mounting bracket fits below the surface of said cover, and said screws are inserted into said mounting bracket.

7. The system of claim 6 wherein said mounting bracket has a plurality of cable accepting channels, said channels allowing access between said cathode ray tube and said system unit.

8. The system of claim 3 wherein said cathode ray tube is mounted so that it is spaced apart from the centrally located above said system unit.

9. The system of claim 1 wherein said system unit further has a planar lower surface.

10. The system of claim 1 wherein said system unit has a front face containing a slot, a planar upper surface and further contains a keyboard, said keyboard placed on a sliding rack and said sliding rack operable to slide said keyboard within said slot in said system unit front face.

11. The system of claim 10 wherein said keyboard has a depth smaller than that of said system unit, such that said keyboard fits entirely within the depth occupied by said system unit.

12. The system of claim 1 wherein said system unit contains an isolation transformer.

13. The system of claim 1 wherein said system further contains a lower mounting bracket, said lower mounting bracket attached to said system unit and containing a planar back surface, such that said lower mounting bracket may be attached to said system unit and mounted against a wall.

14. The system unit of claim 1 wherein said system unit has a planar upper surface, and said cathode ray tube is mounted to said mounting surface such that there is clearance between said upper surface and said cathode ray tube.

15. A bedside data management system comprising:
a system unit;
a cathode ray tube;
a mounting bracket, said mounting bracket supporting said cathode ray tube and said mounting bracket integrally connected to said system unit, and wherein;
said system unit and said mounting bracket each have a planar back surface, such that said mounting bracket and said system unit may be mounted against a wall with said respective back surfaces coplanar and abutting the wall, with said cathode ray tube supported by said mounting bracket; and
wherein said system unit further has a planar lower surface.

16. The system of claim 15 wherein said mounting bracket supports said cathode ray tube by means of a torsion spring.

17. The system of claim 16 wherein said cathode ray tube is rotatable about said mounting bracket, and wherein said torsion spring maintains the rotational position of said cathode ray tube independent of user placement of said cathode ray tube.

18. The system of claim 16 wherein said cathode ray tube is less than 13 inches in depth.

19. The system of claim 15 wherein said mounting bracket has a pair of arms for supporting said cathode ray tube.

20. The system of claim 15 wherein said mounting bracket is attached to said system unit by a plurality of screws, and said system unit contains a cover with an opening accepting said mounting bracket such that a cover section of said mounting bracket fits below the surface of said cover, and said screws are inserted into said mounting bracket in said mounting bracket lower section.

21. The system of claim 20 wherein said mounting bracket has a plurality of cable accepting channels, said channels allowing access between said cathode ray tube and said system unit.

22. The system of claim 15 wherein said cathode ray tube is mounted so that it is spaced apart from and centrally located above said system unit.

23. The system of claim 15 wherein said system unit has a front face containing a slot, a planar upper surface and further contains a keyboard, said keyboard placed on a sliding rack and said sliding rack operable to slide said keyboard within said slot in said system unit front face.

24. The system of claim 23 wherein said keyboard has a depth smaller than that of said system unit, such that said keyboard fits entirely the depth occupied by said system unit.

25. The system of claim 15 wherein said system unit contains an isolation transformer.

26. The system of claim 15 wherein said system further contains a lower mounting bracket, said lower mounting bracket attached to said system unit and containing a planar back surface, such that said lower mounting bracket may be attached to said system unit and mounted against a wall.

27. The system of claim 15 wherein said system unit contains internally located peripheral connectors.

28. The system unit of claim 15 wherein said system unit has a planar upper surface, and said cathode ray tube is mounted to said mounting surface such that there is clearance between said upper surface and said cathode ray tube.

29. A bedside data management system comprising:
a system unit;
a cathode ray tube;
a mounting bracket, said mounting bracket supporting said cathode ray tube and said mounting bracket integrally connected to said system unit, and wherein;
said system unit and said mounting bracket each have a planar back surface, such that said mounting bracket and said system unit may be mounted against a wall with said respective back surfaces coplanar and abutting the wall, with said cathode ray tube supported by said mounting bracket;
wherein said system unit further has a planar lower surface; and wherein said system unit has a front face containing a slot, a planar upper surface and further contains a keyboard, said keyboard placed on a sliding rack and said sliding rack operable to slide said keyboard within said slot in said system unit front face.

30. The system of claim 29 wherein said mounting bracket supports said cathode ray tube by means of a torsion spring.

31. The system of claim 30 wherein said cathode ray tube is rotatable about said mounting bracket, and wherein said torsion spring maintains the rotational position of said cathode ray tube independent of user placement of said cathode ray tube.

32. The system of claim 30 wherein said cathode ray tube is less than 13 inches in depth.

33. The system of claim 29 wherein said mounting bracket has a pair of arms for supporting said cathode ray tube.

34. The system of claim 29 wherein said mounting bracket is attached to said system unit by a plurality of screws, and said system unit contains a cover with an opening accepting said mounting bracket such that a cover section of said mounting bracket fits below the surface of said cover, and said screws are inserted into said mounting bracket in said mounting bracket lower section.

35. The system of claim 34 wherein said mounting bracket has a plurality of cable accepting channels, said channels allowing access between said cathode ray tube and said system unit.

36. The system of claim 29 wherein said cathode ray tube is mounted so that it is spaced apart from and centrally located above said system unit.

37. The system of claim 29 wherein said keyboard has a depth smaller than that of said system unit, such that said keyboard fits entirely the depth occupied by said system unit.

38. The system of claim 29 wherein said system unit contains an isolation transformer.

39. The system of claim 29 wherein said system further contains a lower mounting bracket, said lower mounting bracket attached to said system unit and containing a planar back surface, such that said lower mounting bracket may be attached to said system unit and mounted against a wall.

40. The system of claim 29 wherein said system unit contains internally located peripheral connectors.

41. The system unit of claim 29 wherein said system unit has a planar upper surface, and said cathode ray tube is mounted to said mounting surface such that there is clearance between said upper surface and said cathode ray tube.

42. A bedside data management system comprising:
a system unit;
a cathode ray tube;
a mounting bracket, said mounting bracket supporting said cathode ray tube and said mounting bracket integrally connected to said system unit, and wherein;
said system unit and said mounting bracket each have a planar back surface, such that said mounting bracket and said system unit may be mounted against a wall with said respective back surfaces coplanar and abutting the wall, with said cathode ray tube supported by said mounting bracket;
wherein said system unit further has a planar lower surface;
wherein said system unit has a front face containing a slot, a planar upper surface and further contains a keyboard, said keyboard placed on a sliding rack and said sliding rack operable to slide said keyboard within said slot in said system unit front face; and
wherein said system further contains a lower mounting bracket, said lower mounting bracket attached to said system unit and containing a planar back surface, such that said lower mounting bracket may be attached to said system unit and mounted against a wall such that said wall back surface is coplanar with said system unit back surface.

43. The system unit of claim 42 wherein said system unit has a planar upper surface, and said cathode ray tube is mounted to said mounting surface such that there is clearance between said upper surface and said cathode ray tube.

44. A care management workstation comprising:
a system unit;
a cathode ray tube;
a mounting bracket, said mounting bracket supporting said cathode ray rube and said mounting bracket integrally connected to said system unit, and wherein;
said system unit and said mounting bracket each have a planar back surface, such that said mounting bracket and said system unit may be mounted against a wall with said respective back surfaces coplanar and abutting the wall, with said cathode ray tube supported by said mounting bracket;
wherein said system unit further has a planar lower surface;
wherein said system unit has a front face containing a slot, a planar upper surface and further contains a keyboard, said keyboard placed on a sliding rack and said sliding rack operable to slide said keyboard within said slot in said system unit front face;
wherein said system further contains a lower mounting bracket, said lower mounting bracket attached to said system unit and containing a planar back surface, such that said lower mounting bracket may be attached to said system unit and mounted against a wall with said respective back surfaces coplanar and abutting the wall; and
wherein said mounting bracket is attached to said system unit by a plurality of screws, and said system unit contains a cover with a removed portion capable of accepting said mounting bracket such that a cover section of said mounting bracket fits below the surface of said cover, and said screws are inserted into said mounting bracket in said mounting bracket lower section.

* * * * *